United States Patent
Pire et al.

(10) Patent No.: US 7,499,773 B2
(45) Date of Patent: Mar. 3, 2009

(54) METHOD AND APPARATUS FOR ASSISTING THE PILOTING OF AN AIRCRAFT AT LOW ALTITUDE

(75) Inventors: Richard Pire, Istres (FR); Francois-Xavier Filias, Lambesc (FR)

(73) Assignee: Eurocopter, Marignane Cedex (FR)

( * ) Notice: Subject to any disclaimer, the term of this patent is extended or adjusted under 35 U.S.C. 154(b) by 491 days.

(21) Appl. No.: 11/438,227

(22) Filed: May 23, 2006

(65) Prior Publication Data

US 2007/0055418 A1 Mar. 8, 2007

(30) Foreign Application Priority Data

May 24, 2005 (FR) .................... 05 05173

(51) Int. Cl.
*B64D 43/00* (2006.01)
*G06F 19/00* (2006.01)

(52) U.S. Cl. .................. 701/3; 701/4; 701/9; 340/970; 342/29

(58) Field of Classification Search ............ 701/3, 701/4, 9, 10, 6, 11, 14; 340/967, 970, 974, 340/977, 979, 983; 342/29, 38, 50
See application file for complete search history.

(56) References Cited

U.S. PATENT DOCUMENTS

| 555,175 | A | 2/1896 | Lockerby |
| 3,245,076 | A | 4/1966 | Tilly et al. |
| 3,396,391 | A | 8/1968 | Anderson et al. |
| 5,526,000 | A | 6/1996 | Chazelle et al. |
| 5,892,462 | A | 4/1999 | Tran |
| 6,216,065 | B1 * | 4/2001 | Hall et al. ............. 701/16 |
| 6,243,482 | B1 | 6/2001 | Eibert et al. |
| 7,295,134 | B2 * | 11/2007 | Jourdan et al. ......... 340/963 |
| 2004/0178943 | A1 * | 9/2004 | Niv .................... 342/29 |

FOREIGN PATENT DOCUMENTS

FR 2 712 251 5/1995

* cited by examiner

*Primary Examiner*—Tan Q Nguyen
(74) *Attorney, Agent, or Firm*—Young & Thompson (57) ABSTRACT

In a method of the invention for assisting the piloting of an aircraft, a guard curve (CGS) is determined as a function of the resources of the aircraft, the position of an obstacle (O) or a terrain point situated in front of the aircraft is measured by telemetry, the distance D between the guard curve and the obstacle (O) or the terrain point is calculated, and a pull-down order or a pull-up order is produced as a function of the distance D.

18 Claims, 4 Drawing Sheets

METHOD AND APPARATUS FOR ASSISTING THE PILOTING OF AN AIRCRAFT AT LOW ALTITUDE

The present invention relates to a method and to apparatus for assisting the piloting of an aircraft at low altitude.

The technical field of the invention is that of providing systems on board rotorcraft for assisting piloting, e.g. a pilot's associate system.

The present invention relates more particularly to a system for assisting piloting by giving a pilot or a computer a pull-down order or a pull-up order in order to enable the aircraft to fly as close as possible to (natural or artificial) obstacles and/or to the terrain.

BACKGROUND OF THE INVENTION

Flying as close as possible to obstacles so as to perform a contour flight (civil or military) or a tactical flight (military) is extremely difficult since the pilot can rely only on what can be seen, on external aids (sensors and cameras), usually without any distance information, and on knowledge about the aircraft being flown (specifically the resources it has available and its load factors).

Under conditions of poor visibility or at night, flights of this type become practically impossible.

At best, the aids to piloting that are presently available provide information for avoiding obstacles and for indicating their presence, but they do not inform the pilot about possibilities of "optimized" flight over obstacles.

The following conventional abbreviations are used herein:
OWS: obstacle warning system;
LIDAR: light detection and ranging;
RADAR: radio detection and ranging;
CCD: charge-coupled device;
LI: light intensification;
IR: infrared;
MMI: man/machine interface;
HUD: head-up display;
HMS/D: helmet mounted sight/display;
IRS: inertial reference system;
INS: inertial navigation system;
AHRS: attitude and heading reference system;
GPS: global positioning system;
FOV: field of view;
FOR: field of regard.

Various automatic piloting systems or systems for assisting the piloting of an aircraft at low altitude have been proposed, that make use of a guard curve (or profile) associated with the aircraft and that compare said curve or profile with the profile of the terrain being overflown and/or of the terrain extending in front of the aircraft.

Such a guard curve can be constituted essentially by a simple horizontal straight line extending at a predetermined height below the aircraft, referred to as the "guard" height; in order to take account of obstacles lying ahead of the aircraft, and in order to delay giving an order to pull-up once such an obstacle has been detected as crossing the horizontal guard line, the curve may comprise a horizontal portion extended by a sloping segment so as to present a "ski toe" shape.

U.S. Pat. No. 3,396,391 describes improvements to a guard curve of this type and proposes modifying the curve as a function of the modulus and of the inclination of the aircraft velocity.

That patent describes in particular a pull-down guard profile comprising a first circular arc of radius corresponding to the pull-up radius, and a second circular arc tangential to the first arc and of radius corresponding to the sum of the pull-up radius plus the pull-down radius, the values of these radii depending on the square of the aircraft velocity; that patent also describes a device that delivers pull-up or pull-down orders as a function of comparing such a guard profile with the profile of the terrain as scanned by a radar.

French patent No. 2 712 251 and U.S. Pat. No. 5,555,175 describe a method of assisting piloting in which a guard curve is used to determine which obstacles are dangerous for the aircraft; in that method, the field in front of the aircraft and that is likely to be reached from the current position is subdivided into angular sectors, and for each sector obstacles are determined as seen by a telemetry detector; thereafter the tops of the obstacles are compared with the guard curve in order to select those obstacles that are closest to the curve; the tops of these obstacles are presented to the pilot superposed on an image of the external landscape together with a hair cross indicating the direction of the velocity vector of the aircraft, either in the form of individual hair crosses or in the form of a smoothed curve interconnecting the tops and referred to as a piloting curve; in order to fly as close as possible to the obstacles, the pilot must superpose the velocity vector hair cross on said curve.

Although that method presents advantages, it is not adapted to pull-down stages of flight; furthermore, that method does not deliver a pull-up order or a pull-down order.

The safety line (or safety cordon) calculated by that method disappears when pulling-up too severely; the pilot is required to maintain the velocity vector of the aircraft above the safety cordon (with an alarm being issued as soon as it goes below), said safety curve preventing the pilot from overflying obstacles as closely as possible.

OBJECTS AND SUMMARY OF THE INVENTION

An object of the invention is to remedy those omissions or drawbacks, at least in part.

An object of the invention is to provide improved methods, apparatuses, and/or systems for assisting the piloting of an aircraft; another object of the invention is to propose such methods, systems, or apparatuses that are particularly well adapted to rotorcraft.

An object of the invention is to propose an order director (or issuer) so that the pilot can follow the best possible trajectory in a vertical plane relative to the relief ahead of the pilot, as a function of the aircraft velocity vector, and with information being displayed by a safety cordon that can act as an order director; the order director must inform the pilot whenever it is necessary to go up (pull-up) or down (pull-down) in order to fly as close as possible to obstacles with a given safety margin (guard height).

An object of the invention is to optimize the calculation of possible trajectories to be followed for a wide field of use, so as to be able to perform tactical flying or contour flying in safety with the help of an obstacle detector (LIDAR or RADAR type OWS, in particular).

In a first aspect, the invention provides a method of assisting the piloting of an aircraft, the method comprising determining a guard curve as a function of the resources of the aircraft, using telemetry to measure the position of at least one obstacle and/or at least one terrain point situated in front of the aircraft, calculating the distance D between the guard curve and the obstacle (or point of the terrain), and (preferably) producing a pull-down order or a pull-up order as a function of said distance.

A preferred implementation of the invention comprises determining a first guard curve, referred to as a "static" guard curve, as a function in particular of a pull-up radius of curvature and of a pull-down radius of curvature, these two radii being respectively determined as a function of a pull-up load factor and of a pull-down load factor, and also as a function of the modulus of the aircraft velocity; and, in order to determine the distance D between the static guard and the terrain, calculating the distances between said curve and each of respective corresponding points of the terrain profile having coordinates that are calculated from the coordinates of plots delivered by a telemeter and from aircraft position information delivered by a navigation tool, and then determining the smallest of said distances, and attributing its value to said distance D.

A more preferred implementation comprises determining a pull-down order or a pull-up order as a function of the approach velocity VRA at which the terrain profile and/or the obstacles is/are approaching said static guard curve; with said approach speed VRA generally being calculated using the formula:

$$VRA = \frac{\Delta D}{\Delta t}$$

where ΔD is the variation in the distance D between two successive time markers (or instants), and where Δt is the time that elapses between said two time markers.

More preferably, the method comprises selecting a warning time τ and producing a pull-up order when the sum of the distance D plus the product of the warning time τ multiplied by the approach velocity VRA is negative; and in contrast, when said sum S (S=D+τ*VRA) is positive, producing a pull-down order.

In order to construct a piloting curve for each terrain profile (in a vertical plane), the method comprises selecting the point of the profile that corresponds to a maximum pull-up order, when such a point exists, i.e. the point for which the absolute value of said sum, which in this case is negative, is at a maximum; when said sum S is positive, which corresponds to a pull-down order, or zero, for all of the points of the profile of the terrain under consideration, it is possible to select the profile point for which the absolute value of said sum is at a minimum, in order to fly as close as possible to the ground or to the obstacles; alternatively, it is possible under such circumstances to select the point of the profile for which the following expression for T:

$$T = -D / \left(\frac{\Delta D}{\Delta t}\right)$$

is at a minimum, in order to make pull-down orders less frequent.

By retaining the point as selected in this way for each of the terrain profiles corresponding to a lateral angular scan (e.g. from left to right) of the field of view of the pilot—or of the space in front of the aircraft—and by forming a graph of the sight and relative bearing angles of these points, a piloting curve is obtained that can be presented to the pilot, preferably superposed on an image of said field or space, and also together with an artificial horizon line and a hair cross representing the current velocity vector of the aircraft.

In a preferred implementation, the guard height is predetermined by the pilot or can be a function of parameters of the aircraft, in which case the guard height can be dynamic.

Said static guard curve preferably comprises a first circular arc of radius equal to the sum of the pull-down radius of curvature plus the guard height relative to the ground, and a second circular arc tangential to the first circular arc, the tangent being horizontal, and of radius equal to the sum of the pull-down radius of curvature plus the pull-up radius of Curvature.

In another aspect of the invention, an indicator is provided for indicating the level (or degree) of the danger represented by obstacles detected by telemetry in front of an aircraft, the indicator having means for calculating a warning coefficient—or danger level—as a function of the distance D between a guard curve and a terrain profile, and as a function of the time derivative (or variation) of said distance, said derivative corresponding to said obstacle approach velocity.

BRIEF DESCRIPTION OF THE DRAWINGS

Other characteristics and advantages of the invention appear from the following description which refers to the accompanying figures that show a preferred embodiment of the invention without any limiting character.

FIGS. 7 to 12 are diagrams showing the implementation of a terrain-following method of the invention; FIG. 7 is a section view in a vertical plane containing the trajectory, while

MORE DETAILED DESCRIPTION

General Description

1) Calculating an Order Director Curve (or Cordon)

With reference to FIGS. 4 to 13 in particular, starting from data 20 coming from an on-board OWS 21 that are converted in a three-dimensional frame of reference with the help of data 22 supplied by a navigation tool 23 (in particular an INS, AHRS, or GPS), a module 24 of the terrain-following system 25 of the invention calculates the points of a safety curve CP for presenting to the pilot in eight equal angular sectors 30 that are predefined as a function of the horizontal field of regard (FOR) of the OWS; these points, the coordinates of a hair cross RE representing the current velocity vector, and the coordinates of an artificial horizon HA constitute the data 27 delivered by the module 24 to a display 26.

Figure 4:
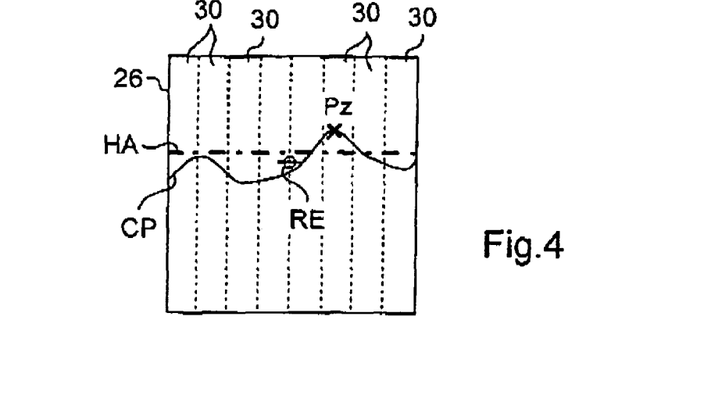
FIG. 4 is a diagram showing the display on a screen of a piloting curve, an artificial horizon, and a hair cross representative of the current speed vector in a forward field subdivided into eight angular sectors.

These points of the curve CP are obtained from guard curves that are calculated as a function of obstacles located in front of the aircraft.

This safety curve CP assists the pilot in following the terrain (and serves as an order director, where appropriate), as a function of the position of the velocity vector of the aircraft relative to the curve, and also as a function of the position of the velocity vector relative to the artificial horizon line.

The pilot is required to maintain the aircraft velocity vector as close as possible to the calculated safety curve by piloting appropriately as a function of the velocity vector, of the artificial horizon line, and of the order director (giving orders to pull-up or pull-down).

The artificial horizon line gives additional information that is useful in helping the pilot understand the effects of piloting actions relative to the safety curve.

A preferred method or system of the invention makes use of two guard curves referred to respectively as being "static" and "dynamic" that enable parameters to be synthesized for rational piloting:

- a static guard curve is calculated using a pull-up radius of curvature and a pull-down radius of curvature (as explained in detail below); this curve serves to calculate a warning time and a clearance margin relative to an obstacle situated in front of the aircraft and as a function of the velocity vector;
- an avoidance order is calculated as a function of a dynamic guard curve which is calculated as a function of a distance factor (D) and a speed of approach (dD/dt) for obstacles relative to the static guard curve, and also the modulus of the velocity vector; this second guard curve dynamically evaluates the trajectory of the aircraft that comes as close to possible to the obstacles present in the FOV of the OWS.

The safety line presented to the pilot and calculated in accordance with the present invention is thus a function of a dynamic guard curve evaluated from the static guard curve.

Starting from these two calculated guard curves, an order director "cordon" is calculated that is servo-controlled to the velocity vector $\vec{V}$ (Vx, Vy, Vz) in the manner described in detail below; a point of this cordon corresponds to a point situated above the obstacle in front of the aircraft that gives the maximum pull-up order or the minimum pull-down order (with a margin that corresponds to a guard height that is predetermined or variable as a function of flying parameters).

2) The System and the Display to the Pilot of the Guard and/or Order Director Curve A system of the invention includes or is connected to an obstacle detector capable of giving plots—in a three-dimensional frame of reference—in front of the aircraft; it is preferable to use a LIDAR type OWS (or a millimetric RADAR) in order to detect wire obstacles in robust manner.

The raw plots are acquired in the three-dimensional space (Si, Gi, Di) (where Si=the angle of sight (or elevation), Gi=the relative bearing angle, and Di=distance), and navigation data is used to transform the measured plots into 3D coordinates in a rectangular frame of reference (x, y, z) relative to the ground; this operation is performed by the computer unit 24 which also calculates the "safety line and/or order director".

In this computer unit an artificial horizon is included for the display as calculated by the inertial navigation tools (AHRS).

With the help of an external camera (29, FIG. 13), a real time image 28 is obtained of the outside scene (LI, IR, CCD, or other imager).

The safety cordon (order director) calculated by the method described below is superposed on the image acquired by the camera, together with the velocity vector in head-up mode (HUD or HMS/D); the same display also shows the artificial horizon line.

Instructions to pull-up or to pull-down as a function of the safety cordon (for terrain following) can be issued either with the help of arrows pointing in the direction in which the pilot is to orient the velocity vector of the aircraft, or else by using sound instructions of the "pull-up" or "sink-rate" type.

The artificial horizon line helps in understanding the external scene. Given that obstacle avoidance must take place horizontally in a vertical trajectory, the pilot can discover whether the aircraft is well "placed" to avoid the obstacle, in spite of having very poor vision.

In a head-down display mode, a terrain-following alarm system can be provided that makes use of warning lights and sounds that are proportional to the danger and to the direction that should be followed by the pilot pulling-up or -down, in each of the angular sectors of the FOR.

DETAILED DESCRIPTION OF A PREFERRED EMBODIMENT OF THE INVENTION

The OWS and the navigation instruments enable a "cloud" of points on the ground to be obtained in a ground-based frame of reference in a three-dimensional space. A LIDAR can be used in clear weather, and a RADAR can be used when the LIDAR is no longer operational (in bad weather).

On the basis of the data delivered by these instruments, a computer estimates the two guard curves and makes use of them in order to determine the safety cordon that is to be used as the order director in order to fly as close as possible to the terrain with a given guard height (obstacle clearance margin).

For each predefined angular sector, one or more points of the safety and/or order director curve are determined.

The velocity vector of the aircraft must be maintained as close as possible to the safety cordon; proximity margins are determined in order to avoid having continuous alarms whenever the velocity vector departs from the order director cordon.

The horizon line assists the pilot in positioning the symbol representing the aircraft velocity vector on the safety cordon (FIGS. 7 to 12).

A pull-down order is generated when the velocity vector lies above the cordon, being separated therefrom by a value greater than the proximity margin; conversely, a pull-up order is generated when the velocity vector passes under the cordon, being separated therefrom by a value greater than the proximity margin.

A head-up mode display system on which the previously calculated order director line, the velocity vector, and the artificial horizon line are superposed on an image of the outside environment, serves as a man/machine interface.

Figure 8:
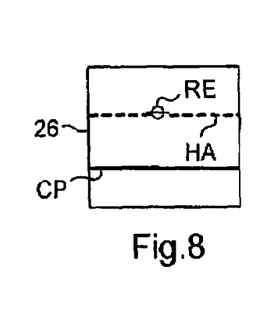
FIGS. 8 to 12 show the display of a piloting curve corresponding to respective stages of the flight shown in FIG. 7 and identified by roman numerals VIII to XII in FIG. 7.

In the configuration shown in FIG. 8, the cordon lies below the velocity vector; a pull-down order is therefore issued and the pilot must apply the pull-down load factor.

Figure 9:
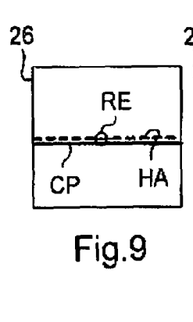

In the configuration shown in FIG. 9, the cordon CP, the velocity vector RE, and the horizon line HA are in alignment there is no pull-up or pull-down order.

Figure 10:
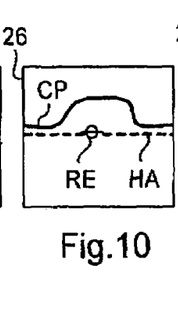

In the configuration shown in FIG. 10, a pull-up order is generated; the pilot applies the pull-up load factor so as to have the velocity vector symmetrically opposite the horizon relative to the cordon.

Figure 11:
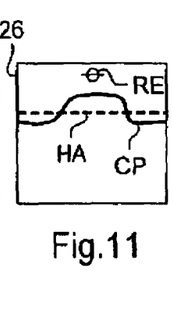

In the configuration shown in FIG. 11, the pilot is pulling-up; the velocity vector is situated above the cordon; by means of this maneuver the pilot is seeking to bring the velocity vector into alignment on the horizon line by coming to the safety cordon as nearly tangentially as possible, i.e. without going under it.

Figure 12:
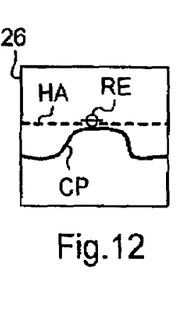
Figure 13:
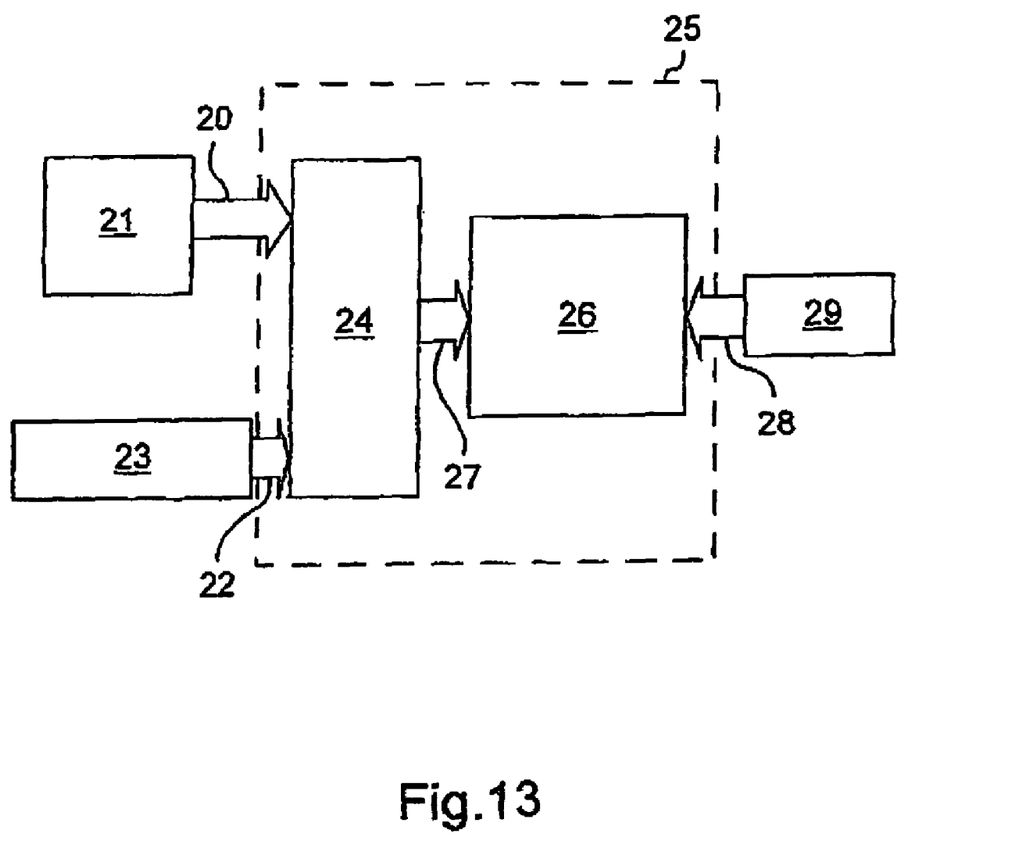
FIG. 13 is a block diagram of a system of the invention.

In the configuration shown in FIG. 12, the cordon is stabilized relative to the horizon line, with the velocity vector being situated on the safety cordon.

The safety curve shown in FIGS. 4 and 9 to 13 performs two functions: a safety cordon function (the velocity vector must always be above the cordon) and an order director function for following the terrain as closely as possible.

Calculating the Static Guard Curve

The purpose of the "terrain-following" function is to provide piloting orders (for manual or automatic piloting) in such a manner that the aircraft describes a trajectory in the vertical plane such that over ground that is substantially horizontal or that presents little irregularity, the relative altitude h of the aircraft is as close as possible to the guard altitude Hg (a constant set by the pilot), and such that above ground that is very uneven, crests are passed over at a relative altitude that is close to Hg with a velocity vector that is substantially horizontal.

Since the pull-up and pull-down load factors are limited, the optimum trajectory is obtained when the aircraft uses the design maximum load factors (nc and np as defined below).

Figure 2:
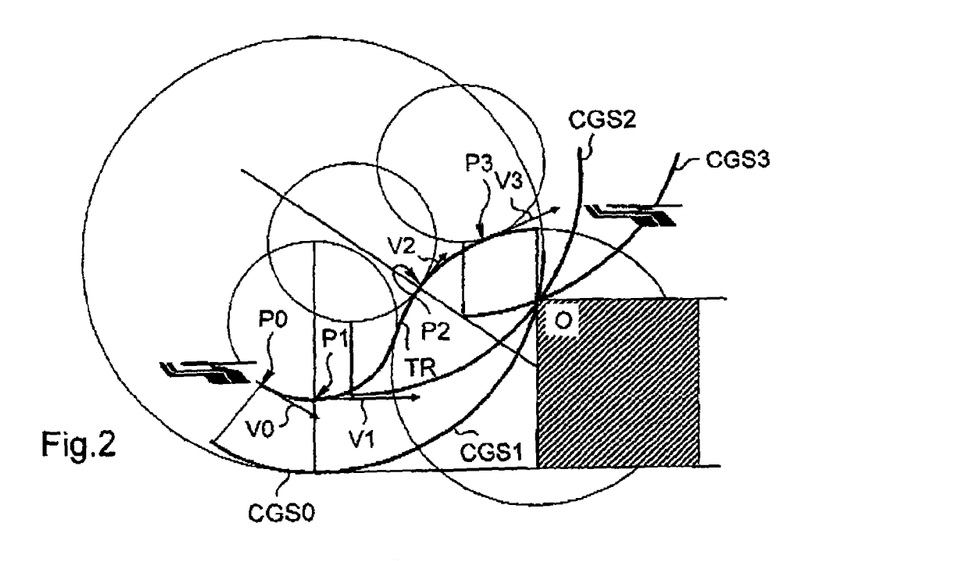
FIG. 2 is a diagram in a vertical plane showing four successive positions of an aircraft traveling to avoid an obstacle by using a method of the invention.
Figure 3:
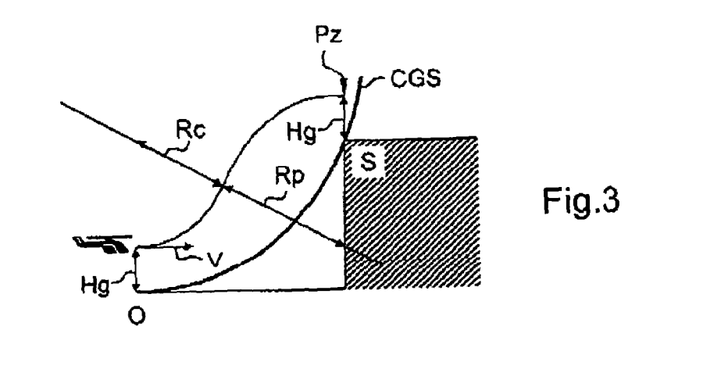
FIG. 3 is a diagram in a vertical plane illustrating the theoretical trajectory for avoiding an obstacle following two successive circular arcs.

In Order to Clear a High Obstacle that is Far Away in the Field in Front of the Aircraft For a helicopter traveling along a velocity vector $\vec{V}$ (Vx, Vy, Vz) at a guard height Hg relative to the ground and coming up to an obstacle of height S, the maneuver for enabling the helicopter to avoid the obstacle consists in pulling-up and then in pulling-down so as to take up a height Hg above the obstacle O (see FIGS. 2-3).

When working with a maximum pull-up load factor nc and a maximum pull-down load factor np, the optimum trajectory comprises two circular arcs of radius Rc and Rp; the pull-up load factor nc and the pull-down load factor np are functions of the roll angle of the aircraft.

The static guard curve CGS is defined as the curve where it is possible to make use of available resources to avoid all obstacles situated on the "outside" of the curve (relative to the position of the aircraft), and impossible for any obstacles situated on the "inside".

These two radii of curvature are defined respectively by the following relationships:

$$Rc = \frac{V^2}{g*(nc-1)} \text{ and } Rp = \frac{V^2}{g*(1-np)}$$

in which:
 V is the velocity of the aircraft;
 g is the acceleration due to gravity;
 Rc is the pull-up radius of curvature; and
 Rp is the pull-down radius of curvature.
The X, Y coordinates of the guard curve are such that:

$X=(Rc+Rp)\cos(\psi)$, and $Y=(Rc+Rp)(1-\sin(\psi))$

Eliminating $\psi$ gives:

$X^2+(Y-R)^2=R^2$; where $R=Rc+Rp$

The static guard curve CGS comprises a circular arc of radius R=Rc+Rp.

For Making Contact with the Ground at an Altitude Hg (After Clearing a Crest)

Under such circumstances, the angle $\phi$ between the velocity vector and the horizontal lies in the range ($-\pi/2$) and 0.

For the aircraft to pass from a pull-down flight stage (sinking at constant slope) to a horizontal flight stage at the height Hg above the ground, the plot of its trajectory in a vertical plane follows a circular arc of radius equal to the pull-up radius.

Thus, while the aircraft is pulling-down, it is necessary to extend the guard curve CGS (to the left) by a circular arc of radius equal to the sum (Rc+Hg).

Figure 1:
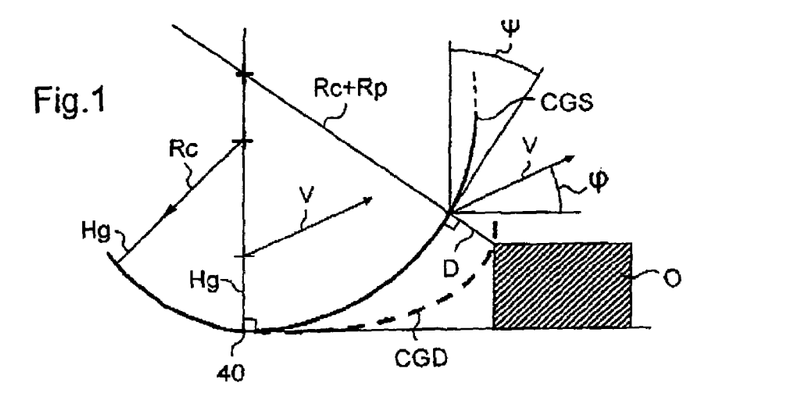
FIG. 1 is a diagram showing the construction of a static guard curve as a function of the performance of an aircraft and the construction of a dynamic guard curve for a determined example of a vertical profile of terrain.

The static guard curve CGS is thus made up of two circular arcs having respective radii (Rc+Hg) and (Rp+Rc) and presenting a common horizontal tangent at the point 40 where they meet, as shown in FIG. 1 in particular.

This curve CGS moves with the aircraft under conditions that depend on the successive orientations of the velocity vector during the flight; nevertheless, it can be observed that so long as the aircraft is pulling-up, the curve CGS remains stationary; the aircraft is then capable, by extending its upward path to a greater or lesser extent, of passing over any obstacle situated outside the static guard curve.

In contrast, as soon as the aircraft begins to pull-down, it is necessary to pivot the curve so that the velocity vector is always parallel to the tangent to the S-shaped curve.

Piloting orders should be calculated so that no obstacle penetrates into the inside of this static guard curve; otherwise the load factor limitations of the system will no longer allow the aircraft to clear the obstacles by the minimum altitude Hg.

The transformation of the static guard curve from CGS0 to CGS1, then to CSG2, and then to CGS3, thus takes place as a function of the direction of the velocity vector $\vec{V}n$ at successive points Pn (n $\in$ {0,1, 2, 3}) of the trajectory TR, as shown diagrammatically in FIG. 2.

Dynamic Guard Curve

It is therefore necessary at each instant to servo-control the guard curve on the most dangerous obstacle, which amounts to continuously modifying the trajectory of the aircraft so that the guard curve "slides" over the obstacle.

It is assumed that the obstacle is to be cleared at constant velocity.

By using D to represent the "penetration" of the obstacle into the guard curve, i.e. the smallest distance between the obstacle profile and the static guard curve, and by using G to represent an "ergonomic" amount of gain to enable the order to be made proportional to the life-sized display for the pilot, the order is chosen to be equal to the product (G*D).

In practice, this order consists in varying the angle (written $\phi$) made by the velocity vector with the horizontal (cf. FIG. 1), which is such that:

$$\frac{d\varphi}{dt} = G*D$$

Calculating the static guard curve makes it possible to calculate D and $$\frac{dD}{dt}$$

in a theoretical model.

In order to stabilize the system, a damping term is introduced into the preceding equation which then becomes:

$$\frac{d\varphi}{dt} = G * \left(D + \tau * \frac{dD}{dt}\right)$$

The dynamic guard curve CGD defined for a system for following terrain in the vertical plane is the locus of obstacle points giving a zero pull-up or pull-down order; the shape of this curve CGD is close to that of a spiral (cf. FIG. 1).

Thus, during a terrain-following mission, the dynamic guard curve "slides" over obstacles as the aircraft advances.

The dynamic guard curve is thus defined by the following equation:

$$D + \tau * \frac{dD}{dt} = 0$$

where D is the penetration of the obstacle into the static guard curve and $\tau$ is a time constant in seconds (negative).

The dynamic guard curve is used for calculating the order and for representing the safety and/or order director cordon.

For each vertical plane in the scanned field, the obstacle avoidance computer calculates the values D and $$\frac{dD}{dt}$$

from the profile of the terrain in said plane and from the static guard curve, and delivers the avoidance order for piloting.

Figure 5:
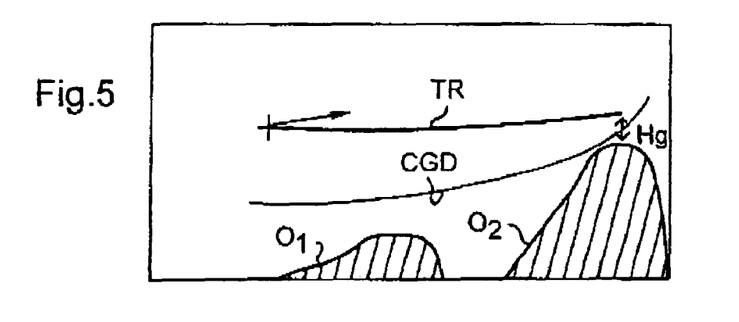
FIGS. 5 and 6 are diagrams in a vertical plane showing two variant courses for piloting an aircraft facing two obstacles.
Figure 6:
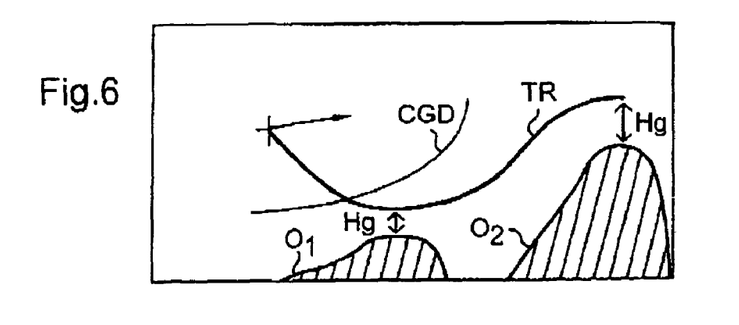

The value $\tau$ serves to give a warning time relative to an obstacle while in flight; this value is a constant that can be varied in order to modify the type of flying: a large value for $\tau$ corresponds to flying with variations that are progressive (FIG. 5), while a small value for $\tau$ corresponds to flying with variations that are sudden (FIG. 6).

In FIG. 5, with a high value for $\tau$, the most dangerous obstacle is the obstacle O2; the safety cordon gives a terrain-following flight trajectory with the guard height Hg over said obstacle.

In FIG. 6, the guard curve does not exist over the obstacle O2; the order is given to pull-down to the obstacle O1 in order to pass over it at the guard height Hg, and the obstacle O2 is cleared subsequently with an appropriate flight trajectory once the guard curve CGD encounters said obstacle, given that the warning time is shorter than that corresponding to FIG. 5.

In order to obtain "smoother" flying, it is also possible to use smaller load factors nc and nd.

It should be observed that the term $$\frac{dD}{dt}$$

can be replaced by the term [V*cos($\psi$+$\phi$)] which corresponds to the "speed of approach" to the obstacle.

Figure 7:
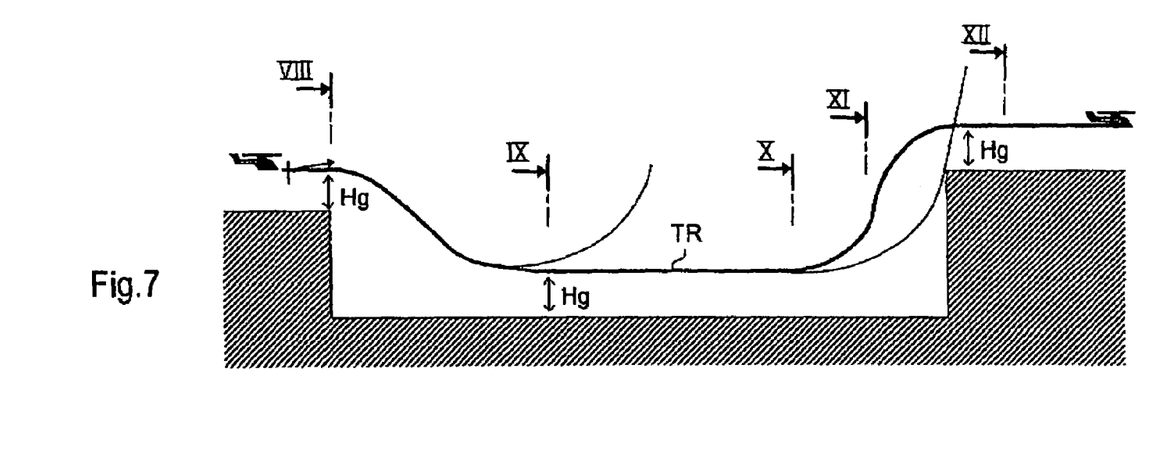

The head-down display of the dynamic curve CGD on a sight/distance type display (as shown in FIGS. 6 and 7) in association with an image of the terrain gives the pilot an excellent overview of the terrain-following system.

Preferred Application for a Rotary Wing Aircraft

Piloting is rationalized by presenting information that is synthesized so as to make it immediately comprehensible and trigger simple actions on the part of the crew; in the presence of obstacles, the pilot must at all times be aware of the margin for clearing the obstacles that will trigger an automatic or manual "pull-up" type action.

This margin is made up of three linked factors: the guard height (minimum height for overflying the obstacle); the load factors of the maneuver to be carried out; and the warning time before applying the resource.

If two of these parameters are set, then the third parameter becomes the "image" of the obstacle clearance margin; given that the maximum load factors in operation are determined by the mechanical strength of the aircraft, and that the guard height is determined by the performance of the terrain-following and navigation system, it is preferable to choose the warning time as the image of the danger represented by the obstacle.

In head-down mode, this image can be given in the form of amber and red alarms and/or, in head-up mode, in the form of a safety cordon in a sight/bearing display where sight is a function of the warning time.

The presentation of the dynamic guard curve and of an order director enables the crew at all times to monitor the integrity of the obstacle avoidance system.

Calculating and Displaying the Order Director Safety Cordon

Starting from the OWS data, 3D plots are obtained facing the pilot in a ground-based frame of reference (x, y, z); a static guard curve is calculated that gives a clearance margin Hg over the obstacles, which curve serves to indicate the obstacle that is closest and that will be used as the basis for calculating the order director cordon.

As a function of the guard curve calculated for each angular sector (eight sectors in the example shown in FIG. 4), points—such as Pz FIG. 4—are obtained that correspond on the safety cordon to the obstacle which will make it necessary to pull-up on being approached or the obstacle which will make it necessary to pull-down on being approached, by aligning the velocity vector (and the artificial horizon line) on said cordon.

Depending on the "hardness" desired for following the terrain, the obstacle that determines the order may differ, but the order is determined on the basis of calculated guard curves and warning times as defined above.

For a military flight, the pilot seeks to fly as close as possible to the obstacles in order to avoid being detected by radar antennas.

The point that minimizes the pull-down order or that maximizes the pull-up order in front of the aircraft for piloting as a function of the velocity vector and the aircraft data serves to construct the "safety and/or order director cordon".

If there are several pull-up or pull-down possibilities, then the pull-up order point is taken that maximizes the possible pull-up orders.

In order words if $$\left(D + \tau * \frac{dD}{dt}\right) < 0,$$

a search is made for the maximum pull-up order amongst the points encountered facing the aircraft such that the algebraic value of the quantity D+$\tau$dD/dt is minimized.

If there is no pull-up order (amongst the points of the terrain profile under consideration), the pull-down order is taken that minimizes the possible pull-down orders.

I.e. if $$\left(D + \tau \frac{dD}{dt}\right) >= 0,$$

then the point is selected that minimizes the pull-down order:

$$\text{Min}\left(D + \tau \frac{dD}{dt}\right).$$

For civilian flights, the pilot seeks to fly as close as possible to obstacles but pull-down orders are less frequent in order to avoid any useless risk and in order to comply with other flying requirements.

As for military type flights, the safety cordon is constructed from the point that maximizes the pull-up order and that minimizes the pull-down order.

If there are several pull-up or pull-down possibilities, then the pull-up order is taken that maximizes the possible pull-up orders: if $$\left(D + \tau \frac{dD}{dt}\right) < 0,$$

a search is made for the point having the greatest sight angle in front of the aircraft.

For calculating the order to pull-down or not to pull-down, i.e. if $$\left(D + \tau \frac{dD}{dt}\right) >= 0,$$

it is possible to proceed differently than for a "military" flight: a value T is calculated defined by $$T = -\frac{D}{\left(\frac{dD}{dt}\right)}.$$

This value corresponds to the time needed prior to applying a resource. Amongst the obstacles that are to be found in the angular sector under consideration, the obstacle that possesses the smallest value for T is the obstacle selected.

Obstacle Detection Alarms in Head-Down Mode

A visual indicator of the danger represented by obstacles in the invention comprises a set of colored lights (e.g. amber and red) giving the danger represented by the obstacle in bearing relative to the true bearing of the aircraft (flight axis) per angular sector of the field in front of the aircraft; this set may comprise three rows of colored light-emitting diodes (LEDs) (cyan, amber, and red).

The function of this indicator, which is made up of a plurality of lines of LEDs located in the top portion of the dashboard or on the windshield fairing, is to specify from the theoretical position of the pilot's eye, the directions of zones that are inaccessible (in red), of zones that are dangerous (in amber), and the direction of the velocity vector (in cyan).

This strip of lights shows the danger represented by obstacles in said sector. For example the red alarm may be triggered for a warning time of 5 seconds (s), and an amber alarm for a warning time of 20 s.

For each obstacle, the value of a warning coefficient is calculated as follows:

$$coeff - \text{warning} = G \times \left[-\frac{D}{\left(\frac{dD}{dt}\right)} + \tau \times \left[\frac{d\left(\frac{D}{\left(\frac{dD}{dt}\right)}\right)}{dt}\right]\right]$$

where:

G is an ergonomic gain or scale factor,

τ is a damping time constant, and

D is a penetration of an obstacle into the static guard curve.

Two thresholds are determined for this coefficient corresponding to the two alarms (amber and red); if the warning coefficient drops below one of the two thresholds, then the corresponding alarm is triggered.

The values of D and $$\frac{dD}{dt}$$

depend on the pull-up and pull-down radii of curvature, and thus on the maximum pull-up and pull-down load factors.

For a flight of a first type (military), $$D + \tau \frac{dD}{dt}$$

takes account of specific values for τ, nc (maximum pull-up load factor), and np (maximum pull-down load factor).

A general warning time τ is initially determined that can possibly vary and that is set as described above.

Three circumstances are then determined (which may have varying intensities amongst the selected values) on the basis of two predetermined sets of values nc1, np1, τ1 and nc2, np2, τ2.

With these sets of values, the following values are calculated:

$$D1 + \tau 1 \frac{dD1}{dt} \text{ and } D2 + \tau 2 \frac{dD2}{dt}$$

(with D1 being a function of nc1, np1; and D2 being a function of nc2, np2).

a) If $D1 + \tau 1 \frac{dD1}{dt} > 0$: no alarm b) If $D2 + \tau 2 \frac{dD2}{dt} < 0$: red alarm c) If $D1 + \tau 1 \frac{dD1}{dt} \leq 0$ and $D2 + \tau 2 \frac{dD2}{dt} \geq 0$: amber alarm.

For flights of a second type (civilian), account is taken with $$D + \tau \frac{dD}{dt}$$

of a value T defined by:

$$T = -\frac{D}{\left(\frac{dD}{dt}\right)}.$$

Depending on the value taken by this parameter T, either no alarm is activated when T is greater than a certain time t1; an amber alarm is activated when T lies between two predefined time values t1 and t2 (such that t2<t1); and a red alarm is activated (for "imminent" danger) if T is less than the time t2.

The safety cordon may be a curve interconnecting the respective crests of the most dangerous obstacles; in a variant, the safety cordon can be displayed in sight and relative bearing where sight corresponds directly to the danger represented by the obstacle.

Considering that the danger represented by an obstacle is a function of a warning time, a warning coefficient is defined as above.

A predefined value of the guard height (or clearance) corresponds to the sight position of the velocity vector at all times; for obstacles that are far away the warning coefficient is greater than the clearance, giving a cordon below the velocity vector, which corresponds to a safe zone; for obstacles that are closer, said coefficient is greater than the clearance and the cordon is above the velocity vector, corresponding to a danger zone.

A switchover command can be provided to enable the crew to view one or other cordon on request: the crest line cordon or the warning time cordon.

Note: the load factor N demanded by the resource needed to avoid the obstacle is calculated by the formula:

$$N = \cos\varphi * \frac{V}{G} * \left[G * \left(D + \tau * \frac{dD}{dt}\right)\right]$$

The invention is particularly adapted to following terrain with strong variations in the orientation of the velocity vector, for assisting the piloting of a rotary wing aircraft.

What is claimed is:

1. A method of assisting the piloting of an aircraft in which a guard curve is determined as a function of the resources of the aircraft, wherein:
   the position of an obstacle or a point of the terrain situated in front of the aircraft is measured by telemetry,
   a distance D is calculated between the guard curve and the obstacle or terrain point,
   the points of a piloting curve (CP) for presenting to the pilot are calculated, in a plurality of angular sectors (30) predefined as a function of a field of regard (FOR), by selecting for each vertical profile of the terrain in a predefined angular sector, the point of the profile that corresponds to a maximum pull-up order, if such a point exists, and if there is no such point, by selecting the point of the profile that corresponds to a minimum pull-down order, the pull-down or pull-up order $$\frac{d\varphi}{dt}$$

being determined using the formula:

$$\frac{d\varphi}{dt} = G * \left(D + \tau * \frac{dD}{dt}\right)$$

where G is a gain and $\tau$ is a warning time, where dD is the variation in the distance D between two successive time markers, and where dt is the time that elapses between said two time markers, and a pull-up order is produced when the sum $$\left(D + \tau * \frac{dD}{dt}\right)$$

is negative, and a pull-down order is produced when the sum $$\left(D + \tau * \frac{dD}{dt}\right)$$

is positive.

2. A method according to claim 1, in which a static guard curve (CGS) is determined as a function of a pull-up radius of curvature and a pull-down radius of curvature, these two radii being determined respectively as a function of a pull-up load factor and as a function of a pull-down load factor, and also as a function of the modulus of the aircraft velocity, and in which, in order to determine the distance D between the static guard curve and a terrain profile in a vertical plane, the distances are calculated between said curve and each of the respective points of the terrain profile, having coordinates that are calculated from the coordinates of plots delivered by a telemeter and from aircraft position information delivered by a navigation tool, and then the smallest of said distances is determined, and its value is given to said distance D.

3. A method according to claim 1, in which the piloting curve is presented to the pilot superposed on an image of the field or space in front of the aircraft, together with an artificial horizon line and a hair cross representing the current velocity vector of the aircraft.

4. A method according to claim 1, in which said static guard curve comprises a first circular arc of radius equal to the sum of the pull-down radius of curvature and a guard height Hg relative to the ground, and a second circular arc tangential to the first circular arc, with a tangent that is horizontal, and of radius equal to the sum of the pull-down radius of curvature plus the pull-up radius of curvature.

5. A method according to claim 4, in which the guard height varies as a function of the aircraft flight parameters.

6. A method according to claim 1, in which the level of the danger represented by an obstacle is calculated as a function of the distance D between a guard curve and a terrain profile including the obstacle, and as a function of the time derivative $$\left(\frac{dD}{dt}\right)$$

(or variation $$\left(\frac{\Delta D}{\Delta t}\right)$$

of said distance, said derivative corresponding to said obstacle approach speed.

7. A method according to claim 1, in which a warning coefficient is calculated for each obstacle or point of a terrain vertical profile, which coefficient is representative of the danger represented by the obstacle, the coefficient being calculated using the following formula:

$$coeff-\text{warning}= G\times\left[-\frac{D}{\left(\frac{dD}{dt}\right)}+\tau\times\left[\frac{d\left(\frac{D}{\left(\frac{dD}{dt}\right)}\right)}{dt}\right]\right].$$

8. A method according to claim 1, in which a visual indicator is presented to the pilot indicating the danger represented by obstacles, the indicator comprising a set of colored lights representing the danger of obstacles in bearing relative to the true bearing of the aircraft, per angular sector of the field in front of the aircraft.

9. A method according to claim 1, in which a visual alarm is activated as a function of warning time values $\tau$, a pull-up load factor nc, and a pull-down load factor np.

10. A method of assisting the piloting of an aircraft in which a guard curve is determined as a function of the resources of the aircraft, wherein:

the position of an obstacle or a point of the terrain situated in front of the aircraft is measured by telemetry, a distance D is calculated between the guard curve and the obstacle or terrain point, the points of a piloting curve (CP) for presenting to the pilot are calculated, in a plurality of angular sectors (30) predefined as a function of a field of regard (FOR), by selecting for each vertical profile of the terrain in a predefined angular, sector, the point of the profile that corresponds to a maximum pull-up order, if such a point exists, and if there is no such point, by selecting the point of the profile for which the expression $$T=-D\Big/\left(\frac{\Delta D}{\Delta t}\right)$$

presents a minimum, the pull-down or pull-up order $$\frac{d\varphi}{dt}$$

being determined using the formula:

$$\frac{d\varphi}{dt}=G*\left(D+\tau*\frac{dD}{dt}\right)$$

where G is a gain and $\tau$ is a warning time, where dD is the variation in the distance D between two successive time markers, and where dt is the time that elapses between said two time markers, and a pull-up order is produced when the sum $$\left(D+\tau*\frac{dD}{dt}\right)$$

is negative, and a pull-down order is produced when the sum $$\left(D+\tau*\frac{dD}{dt}\right)$$

is positive.

11. A method according to claim 10, in which a static guard curve (CGS) is determined as a function of a pull-up radius of curvature and a pull-down radius of curvature, these two radii being determined respectively as a function of a pull-up load factor and as a function of a pull-down load factor, and also as a function of the modulus of the aircraft velocity, and in which, in order to determine the distance D between the static guard curve and a terrain profile in a vertical plane, the distances are calculated between said curve and each of the respective points of the terrain profile, having coordinates that are calculated from the coordinates of plots delivered by a telemeter and from aircraft position information delivered by a navigation tool, and then the smallest of said distances is determined, and its value is given to said distance D.

12. A method according to claim 10, in which the piloting curve is presented to the pilot superposed on an image of the field or space in front of the aircraft, together with an artificial horizon line and a hair cross representing the current velocity vector of the aircraft.

13. A method according to claim 10, in which said static guard curve comprises a first circular arc of radius equal to the sum of the pull-down radius of curvature and a guard height Hg relative to the ground, and a second circular arc tangential to the first circular arc, with a tangent that is horizontal, and of radius equal to the sum of the pull-down radius of curvature plus the pull-up radius of curvature.

14. A method according to claim 13, in which the guard height varies as a function of the aircraft flight parameters.

15. A method according to claim 10, in which the level of the danger represented by an obstacle is calculated as a function of the distance D between a guard curve and a terrain profile including the obstacle, and as a function of the time derivative $$\left(\frac{dD}{dt}\right)$$

(or variation $$\left(\frac{\Delta D}{\Delta t}\right))$$

of said distance, said derivative corresponding to said obstacle approach speed.

16. A method according to claim 10, in which a warning coefficient is calculated for each obstacle or point of a terrain vertical profile, which coefficient is representative of the danger represented by the obstacle, the coefficient being calculated using the following formula:

$$coeff-\text{warning} = G \times \left[ -\frac{D}{\left(\frac{dD}{dt}\right)} + \tau \times \left[ \frac{d\left(\frac{D}{\left(\frac{dD}{dt}\right)}\right)}{dt} \right] \right].$$

17. A method according to claim 10, in which a visual indicator is presented to the pilot indicating the danger represented by obstacles, the indicator comprising a set of colored lights representing the danger of obstacles in bearing relative to the true bearing of the aircraft, per angular sector of the field in front of the aircraft.

18. A method according to claim 10, in which a visual alarm is activated as a function of warning time values τ, a pull-up load factor nc, and a pull-down load factor np.

* * * * *